(12) United States Patent
Sherman

(10) Patent No.: US 11,330,024 B2
(45) Date of Patent: May 10, 2022

(54) PERSONALIZED CONTENT SHARING PLATFORM

(71) Applicant: eBay Inc., San Jose, CA (US)

(72) Inventor: Corinne Elizabeth Sherman, San Jose, CA (US)

(73) Assignee: EBAY INC., San Jose, CA (US)

( * ) Notice: Subject to any disclaimer, the term of this patent is extended or adjusted under 35 U.S.C. 154(b) by 359 days.

(21) Appl. No.: 14/167,715

(22) Filed: Jan. 29, 2014

(65) Prior Publication Data

US 2015/0215349 A1    Jul. 30, 2015

(51) Int. Cl.
| | |
|---|---|
| *H04L 29/06* | (2006.01) |
| *H04L 65/403* | (2022.01) |
| *G06Q 30/02* | (2012.01) |
| *G06Q 50/00* | (2012.01) |
| *H04L 65/612* | (2022.01) |
| *H04L 65/60* | (2022.01) |
| *H04L 65/1063* | (2022.01) |
| *H04L 69/08* | (2022.01) |

(52) U.S. Cl.
CPC ....... *H04L 65/403* (2013.01); *G06Q 30/0241* (2013.01); *G06Q 50/01* (2013.01); *H04L 65/1063* (2013.01); *H04L 65/4084* (2013.01); *H04L 65/605* (2013.01); *H04L 69/08* (2013.01)

(58) Field of Classification Search
CPC ....... H04L 65/403; H04L 47/82; H04L 65/80; H04L 12/12; H04L 65/605; H04L 65/1063; H04L 65/4084; H04L 69/08; G06Q 30/0241; G06Q 50/01; H04N 21/64738; H04N 21/64769

USPC .......................................... 709/204
See application file for complete search history.

(56) References Cited

U.S. PATENT DOCUMENTS

| | | | |
|---|---|---|---|
| 6,055,543 | A | 4/2000 | Christensen et al. |
| 6,067,552 | A | 5/2000 | Yu |
| 6,438,579 | B1 | 8/2002 | Hosken |

(Continued)

FOREIGN PATENT DOCUMENTS

| | | |
|---|---|---|
| AU | 2015324168 | 6/2018 |
| CN | 103327050 A | 9/2013 |

(Continued)

OTHER PUBLICATIONS

"International Application Serial No. PCT/US2015/052620, International Search Report dated Dec. 28, 2015", 2 pgs.

(Continued)

*Primary Examiner* — Jonathan A Bui
*Assistant Examiner* — Timothy Sowa
(74) *Attorney, Agent, or Firm* — Schwegman Lundberg & Woessner, P.A.

(57) ABSTRACT

A system comprising a computer-readable storage medium storing at least one program and a computer-implemented method for providing personalized content sharing service is presented. Consistent with some embodiments, the method may include receiving a request to share a content item with a member of the social network. The method may further include determining an interest of the member of the social network based on social data about the member of the social network. A customized posting to share the content item with the member of the social network is then generated using the interest of the user.

20 Claims, 9 Drawing Sheets

(56) References Cited

U.S. PATENT DOCUMENTS

| | | | |
|---|---|---|---|
| 6,574,635 B2 | 6/2003 | Stauber et al. | |
| 7,089,278 B1 | 8/2006 | Churchill et al. | |
| 7,669,123 B2* | 2/2010 | Zuckerberg | H04L 67/306 |
| | | | 715/273 |
| 7,730,216 B1* | 6/2010 | Issa | H04L 67/104 |
| | | | 709/214 |
| 7,912,701 B1 | 3/2011 | Gray et al. | |
| 7,930,169 B2 | 4/2011 | Billerey-Mosier | |
| 8,095,432 B1* | 1/2012 | Berman | G06Q 30/0631 |
| | | | 705/26.7 |
| 8,171,128 B2 | 5/2012 | Zuckerberg et al. | |
| 8,250,145 B2 | 8/2012 | Zuckerberg et al. | |
| 8,429,630 B2 | 4/2013 | Nickolov et al. | |
| 8,788,263 B1 | 7/2014 | Richfield | |
| 8,793,255 B1 | 7/2014 | Bilinski et al. | |
| 8,805,769 B2 | 8/2014 | Ritter et al. | |
| 9,015,031 B2 | 4/2015 | Ferrucci et al. | |
| 9,183,560 B2 | 11/2015 | Abelow | |
| 9,189,965 B2 | 11/2015 | Singh et al. | |
| 9,189,967 B2 | 11/2015 | Singh et al. | |
| 9,286,397 B1 | 3/2016 | Suleman et al. | |
| 9,436,766 B1* | 9/2016 | Buryak | G06F 16/9535 |
| | | | 707/737 |
| 9,652,787 B2 | 5/2017 | Churchill et al. | |
| 10,073,841 B2 | 9/2018 | Churchill et al. | |
| 10,650,104 B2* | 5/2020 | Churchill | G06Q 30/0239 |
| 2005/0198305 A1* | 9/2005 | Pezaris | H04L 51/12 |
| | | | 709/227 |
| 2006/0178868 A1 | 8/2006 | Billerey-mosier | |
| 2006/0218153 A1* | 9/2006 | Voon | G06Q 30/02 |
| 2006/0218225 A1 | 9/2006 | Hee Voon et al. | |
| 2007/0043583 A1 | 2/2007 | Davulcu et al. | |
| 2007/0282596 A1 | 12/2007 | Suzuki et al. | |
| 2007/0288468 A1 | 12/2007 | Sundaresan et al. | |
| 2008/0134052 A1* | 6/2008 | Davis | G06Q 10/10 |
| | | | 715/744 |
| 2008/0189169 A1 | 8/2008 | Turpin et al. | |
| 2008/0189274 A1 | 8/2008 | Mann | |
| 2009/0144392 A1* | 6/2009 | Wang | G06Q 10/10 |
| | | | 709/217 |
| 2009/0222333 A1 | 9/2009 | Rivas | |
| 2009/0271289 A1 | 10/2009 | Klinger et al. | |
| 2009/0288012 A1 | 11/2009 | Hertel et al. | |
| 2010/0023506 A1 | 1/2010 | Sahni et al. | |
| 2010/0076850 A1 | 3/2010 | Parekh et al. | |
| 2010/0169152 A1 | 7/2010 | Maor et al. | |
| 2010/0281364 A1* | 11/2010 | Sidman | G06F 17/30595 |
| | | | 715/713 |
| 2010/0318571 A1 | 12/2010 | Pearlman et al. | |
| 2011/0004692 A1* | 1/2011 | Occhino | H04L 67/16 |
| | | | 709/228 |
| 2011/0145252 A1 | 6/2011 | Sundaresan et al. | |
| 2011/0191417 A1 | 8/2011 | Rathod | |
| 2011/0255736 A1* | 10/2011 | Thompson | G06Q 50/01 |
| | | | 382/100 |
| 2011/0264528 A1* | 10/2011 | Whale | G06Q 30/02 |
| | | | 705/14.58 |
| 2011/0320960 A1 | 12/2011 | Cai et al. | |
| 2012/0054646 A1 | 3/2012 | Hoomqani et al. | |
| 2012/0084160 A1 | 4/2012 | Badros et al. | |
| 2012/0084657 A1 | 4/2012 | Ranade et al. | |
| 2012/0110064 A1* | 5/2012 | Chen | H04W 4/21 |
| | | | 709/203 |
| 2012/0150598 A1* | 6/2012 | Griggs | G06Q 30/0214 |
| | | | 705/14.16 |
| 2012/0221439 A1 | 8/2012 | Sundaresan et al. | |
| 2012/0253972 A1 | 10/2012 | Oskolkov et al. | |
| 2012/0290448 A1 | 11/2012 | England et al. | |
| 2012/0290553 A1 | 11/2012 | England et al. | |
| 2012/0317109 A1 | 12/2012 | Richter et al. | |
| 2013/0060870 A1 | 3/2013 | Webb et al. | |
| 2013/0073388 A1 | 3/2013 | Heath | |
| 2013/0073983 A1 | 3/2013 | Rasmussen et al. | |
| 2013/0095864 A1 | 4/2013 | Marovets | |
| 2013/0110803 A1 | 5/2013 | Mikalsen et al. | |
| 2013/0159403 A1 | 6/2013 | Zigoris et al. | |
| 2013/0218680 A1* | 8/2013 | Forsblom | G06Q 30/0261 |
| | | | 705/14.58 |
| 2013/0227023 A1 | 8/2013 | Raichelgauz et al. | |
| 2013/0238706 A1* | 9/2013 | Desai | H04L 67/306 |
| | | | 709/204 |
| 2013/0325966 A1* | 12/2013 | Tseng | G06F 17/30867 |
| | | | 709/204 |
| 2013/0346172 A1* | 12/2013 | Wu | G06Q 30/0214 |
| | | | 705/14.16 |
| 2014/0006524 A1 | 1/2014 | Singh et al. | |
| 2014/0013244 A1 | 1/2014 | Lindsay et al. | |
| 2014/0025734 A1 | 1/2014 | Griffin | |
| 2014/0025737 A1* | 1/2014 | Kruglick | H04L 67/22 |
| | | | 709/204 |
| 2014/0068692 A1* | 3/2014 | Archibong | H04L 65/4084 |
| | | | 725/116 |
| 2014/0143228 A1* | 5/2014 | Blue | G06F 17/30867 |
| | | | 707/709 |
| 2014/0189027 A1 | 7/2014 | Zhang et al. | |
| 2014/0278998 A1 | 9/2014 | Systrom et al. | |
| 2014/0279068 A1* | 9/2014 | Systrom | G06Q 30/0277 |
| | | | 705/14.73 |
| 2014/0279184 A1 | 9/2014 | Lai | |
| 2014/0297618 A1 | 10/2014 | Sherman | |
| 2015/0169186 A1* | 6/2015 | Neven | G06Q 10/10 |
| | | | 715/751 |
| 2015/0169571 A1 | 6/2015 | Farago et al. | |
| 2015/0341304 A1 | 11/2015 | Sherman et al. | |
| 2016/0092426 A1 | 3/2016 | Churchill et al. | |
| 2017/0249302 A1 | 8/2017 | Churchill et al. | |
| 2018/0329899 A1 | 11/2018 | Churchill et al. | |
| 2020/0242307 A1 | 7/2020 | Churchill et al. | |

FOREIGN PATENT DOCUMENTS

| | | |
|---|---|---|
| CN | 103353829 A | 10/2013 |
| CN | 103716339 A | 4/2014 |
| CN | 106716967 | 5/2017 |
| KR | 20100120668 A | 11/2010 |
| WO | WO-2015116583 A1 | 8/2015 |
| WO | WO-2016053860 A1 | 4/2016 |

OTHER PUBLICATIONS

"International Application Serial No. PCT/US2015/052620, Written Opinion dated Dec. 28, 2015", 10 pgs.

"International Application Serial No. PCT/US2015/013070, International Search Report dated Apr. 13, 2015", 2 pgs.

"International Application Serial No. PCT/US2015/013070, Written Opinion dated Apr. 13, 2015", 5 pgs.

"U.S. Appl. No. 14/285,211, Examiner Interview Summary dated Dec. 16, 2016", 3 pgs.

"U.S. Appl. No. 14/285,211, Response filed Dec. 13, 2016 to Final Office Action dated Sep. 13, 2016", 12 pgs.

"U.S. Appl. No. 14/500,727, First Action Interview—Office Action Summary dated Sep. 30, 2016", 19 pgs.

"U.S. Appl. No. 14/500,727, Notice of Allowance dated Jan. 10, 2017", 6 pgs.

"U.S. Appl. No. 14/500,727, Response filed Nov. 15, 2016 to First Action Interview—Office Action Summary dated Sep. 30, 2016", 11 pgs.

"U.S. Appl. No. 14/285,211, Examiner Interview Summary dated Jul. 28, 2016", 3 pgs.

"U.S. Appl. No. 14/285,211, Final Office Action dated Sep. 13, 2016", 16 pgs.

"U.S. Appl. No. 14/285,211, Non Final Office Action dated Feb. 26, 2016", 24 pgs.

"U.S. Appl. No. 14/285,211, Response filed Jul. 22, 2016 to Non Final Office Action dated Feb. 26, 2016", 18 pgs.

"U.S. Appl. No. 14/500,727, Examiner Interview Summary dated Aug. 2, 2016", 2 pgs.

"U.S. Appl. No. 14/500,727, First Action Interview—Pre-Interview Communication dated May 24, 2016", 4 pgs.

(56) References Cited

OTHER PUBLICATIONS

"U.S. Appl. No. 14/500,727, Response Filed Jul. 19, 2016 to First Action Interview—Pre-Interview Communication dated May 24, 2016", 2 pgs.
"International Application Serial No. PCT/US2015/013070, International Preliminary Report on Patentability dated Aug. 11, 2016", 7 pgs.
"U.S. Appl. No. 14/285,211, Non Final Office Action dated Apr. 3, 2017", 15 pgs.
"U.S. Appl. No. 14/285,211, Response filed Jul. 3, 2017 to Non Final Office Action dated Apr. 3, 2017", 11 pgs.
"U.S. Appl. No. 15/595,060, Preliminary Amendment filed May 22, 2017", 6 pgs.
"European Application Serial No. 15846905.6, Response to Office Action dated Jun. 7, 2017", 12 pgs.
"International Application Serial No. PCT/US2015/052620, International Preliminary Report on Patentability dated Apr. 13, 2017", 7 pgs.
Final Office Action received for U.S. Appl. No. 14/285,211, dated Nov. 3, 2017, 15 pages.
First Examination Report received for Australian Patent Application No. 2015324168, dated Nov. 21, 2017, 3 pages.
First Action Interview—Pre-Interview Communication received for U.S. Appl. No. 15/595,060, dated Dec. 19, 2017, 4 pages.
Response to Final Office Action filed on Jan. 3, 2018 for U.S. Appl. No. 14/285,211, dated Nov. 3, 2017, 11 pages.
Response to First Examination Report filed on Jan. 24, 2018 for Australian Patent Application No. 2015324168, dated Nov. 21, 2017, 21 pages.
Advisory Action received for U.S. Appl. No. 14/285,211, dated Jan. 26, 2018, 3 pages.
Office Action received for Canadian Patent Application No. 2,961,281, dated Jan. 18, 2018, 4 pages.
Response to Pre-Interview Communication filed on Jan. 18, 2018 for U.S. Appl. No. 15/595,060, dated Dec. 19, 2017, 1 page.
Examiner Interview Summary received for U.S. Appl. No. 15/595,060, dated Feb. 15, 2018, 3 pages.
Notice of Allowance received for U.S. Appl. No. 15/595,060, dated Feb. 16, 2018, 5 pages.
Ehud, Reiter, "20 Natural Language Generation", In: "The Handbook of Computational Linguistics and Natural Language Processing" Blackwell Publishing Ltd, (Aug. 31, 2010), 574-598.
"European Application Serial No. 15846905.6, Extended European Search Report dated Feb. 26, 2018", 9 pgs.
Australian Application Serial No. 2015324168, Notice of Acceptance dated Feb. 28, 2018, 3 pages.
Canadian Application Serial No. 2,961,281, Response filed Mar. 26, 2018 to Office Action dated Jan. 18, 2018, 24 pages.
Amendment filed on Jun. 1, 2018, for Korean Patent Application No. 10-2017-7011547, 18 pages (w/English Claims).
U.S. Appl. No. 14/285,211, Non Final Office Action dated Jun. 27, 2018, 18 pages.
U.S. Appl. No. 15/595,060, Notice of Allowance dated Jul. 17, 2018, 5 pages.
Korean Application Serial No. 10-2017-7011547, Notice of Preliminary Rejection dated Aug. 13, 2018, (w/ English Translation) 17 pages.
"Microsoft Computer Dictionary", 5th Edition, Microsoft Press, Redmond, WA, (2002), 7 pgs.
"U.S. Appl. No. 13/972,580, Non Final Office Action dated Jun. 4, 2015", 18 pgs.
"U.S. Appl. No. 13/972,580, Response filed Oct. 5, 2015 to Non Final Office Action dated Jun. 4, 2015", 13 pgs.
"U.S. Appl. No. 13/972,580, Final Office Action dated Dec. 9, 2015", 16 pgs.
"U.S. Appl. No. 13/972,580, Response filed Feb. 17, 2016 to Final Office Action dated Dec. 9, 2015", 11 pgs.
"U.S. Appl. No. 13/972,580, Final Office Action dated Aug. 25, 2016", 16 pgs.
"Widget (GUI)", Wikipedia, [Online] retrieved from the internet: en.wikipedia.org wiki Widget_(GUI), (2016), 5 pgs.
"U.S. Appl. No. 14/285,211, Response filed Sep. 25, 2018 to Non Final Office Action dated Jun. 27, 2018", 12 pgs.
"Korean Application Serial No. 10-2017-7011547, Response filed Oct. 15, 2018 to Notice of Preliminary Rejection dated Aug. 13, 2018", w English claims, 30 pgs.
"U.S. Appl. No. 14/285,211, Final Office Action dated Nov. 19, 2018", 16 pgs.
Abel, Fabian, "Semantic Enrichment of Twitter Posts for User Profile Construction on the Social Web", Springer-Verlag, Berlin, Germany, (2011), 375-389.
Adams, Paige H, "Topic Detection and Extraction in Chat", Santa Clara, CA, (2008), 581-588.
Carmel, David, "Personalized Social Search Based on the User's Social Network", CIKM'09, (Nov. 2-6, 2009), 1227-1236.
Chen, Kailong, "Collaborative Personalized Tweet Recommendation", Portland, (Aug. 12-16, 2012), 661-670.
Gou, Liang, "SFViz: Interest-based Friends Exploration and Recommendation", (Aug. 4-5, 2011), 10 pgs.
Gursel, Anil, "Producing Timely Recommendations From Social Networks Through Targeted Search", AAMAS—8th International Conference. Budapest, Hungary, (2009), 805-812.
Guy, Ido, "Social Media Recommendation based on People and Tags", Geneva, Switzerland, (Jul. 19-23, 2010), 194-201.
Kinsella, Sheila, "Using Hyperlinks to Enrich Message Board Content with Linked Data", I-SEMANTICS 2010, (2010), 1-9.
Leitner, Peter, "Collaborative Shopping Networks: Sharing the Wisdom of Crowds in E-Commerce Environments", Bled Proceedings, (2008), 16 pgs.
Marlow, Cameron, "HT06, Tagging Paper, Taxonomy, Flickr, Academic Article, To Read", Odense, Denmark, (Aug. 22-25, 2006), 31-39.
Milicevic, Aleksandra, "Social Tagging in recommender systems: a survey of the state-of-the-art and possible extensions". Springer, (2010), 187-209.
Naaman, Mor, "Social multimedia: highlighting opportunities for search and mining of multimedia data in social media applications", Multimed Tools Appl. ,vol. 56, (2011), 9-34.
Nanopoulos, Alexandras, "Item Recommendation in Collaborative Tagging Systems", IEEE Transactions on Systems, (2011), 760-771.
Final Office Action received for Korean Patent Application No. 10-2017-7011547, dated Dec. 27, 2018, 8 pages (4 pages of English Translation and 4 pages of Official Copy Only).
Non-Final Office action received for U.S. Appl. No. 14/285,211 dated Mar. 26, 2019, 20 pages.
Response to Final Office Action filed on Jan. 22, 2019, for U.S. Appl. No. 14/285,211, dated Nov. 19, 2018, 12 pages.
Non-Final Office Action received for U.S. Appl. No. 16/040,788, dated Aug. 21, 2019, 9 pages.
Office Action received for Chinese Patent Application No. 201580052432.X, dated Sep. 10, 2019, 10 pages (6 pages of Official copy and 4 pages of English Translation).
Response to Office Action filed on Jan. 16, 2020, for Chinese Patent Application No. 201580052432.X, dated Sep. 10, 2019, 10 pages (6 pages of Official copy and 4 pages of pending claims).
Notice of Allowance received for U.S. Appl. No. 16/040,788, dated Jan. 8, 2020, 7 pages.
Response to Non-Final Office Action filed on Nov. 20, 2019, for U.S. Appl. No. 16/040,788, dated Aug. 21, 2019, 8 pages.
Amendment Under 37 CFR filed on Mar. 20, 2020 U.S. Appl. No. 16/040,788, 7 pages.
Corrected Notice of Allowability received for U.S. Appl. No. 16/040,788, dated Mar. 11, 2020, 4 pages.
Response to Rule 312 Communication received for U.S. Appl. No. 16/040,788, dated Mar. 31, 2020, 2 pages.
Non Final Office Action Received for U.S. Appl. No. 16/845,767, dated Jul. 26, 2021, 9 Pages.
U.S. Appl. No. 14/285,211, filed May 22, 2014, Personalized Sharing at the User Level.
U.S. Appl. No. 14/500,727, filed Sep. 29, 2014, Generative Grammar Models for Effective Promotion and Advertising.

(56) References Cited

OTHER PUBLICATIONS

U.S. Appl. No. 15/595,060, filed May 15, 2017, Generative Grammar Models for Effective Promotion and Advertising.

* cited by examiner

PERSONALIZED CONTENT SHARING PLATFORM

TECHNICAL FIELD

This application relates to data processing. In particular, example embodiments may relate to systems and methods for providing personalized content sharing services.

BACKGROUND

Social network services (e.g., Facebook®, Twitter®, Pinterest®, or the like) provide users with the ability to post and share content of interest from third parties with members of their social network. Further, some third party websites provide users with an ability to quickly share content with members of a social network directly from a web page via a share widget that interfaces with social network services. However, because these types of social network posts are generic in nature, such postings often fail to capture the attention of the intended audience and the shared content inevitably goes unnoticed by the intended audience.

BRIEF DESCRIPTION OF THE DRAWINGS

Various ones of the appended drawings merely illustrate example embodiments of the present invention and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include systems and methods for providing personalized content sharing services. Consistent with some embodiments, the method may include generating a personalized social network posting to share content with members of a social network, in response to receiving a user request for such. Each personalized social network posting may be customized based on the interests of the intended audience (e.g., members of the social network with whom the content is being shared) so as to increase the likelihood of engagement with the social network posting, and ultimately, with the shared content.

Figure 1:
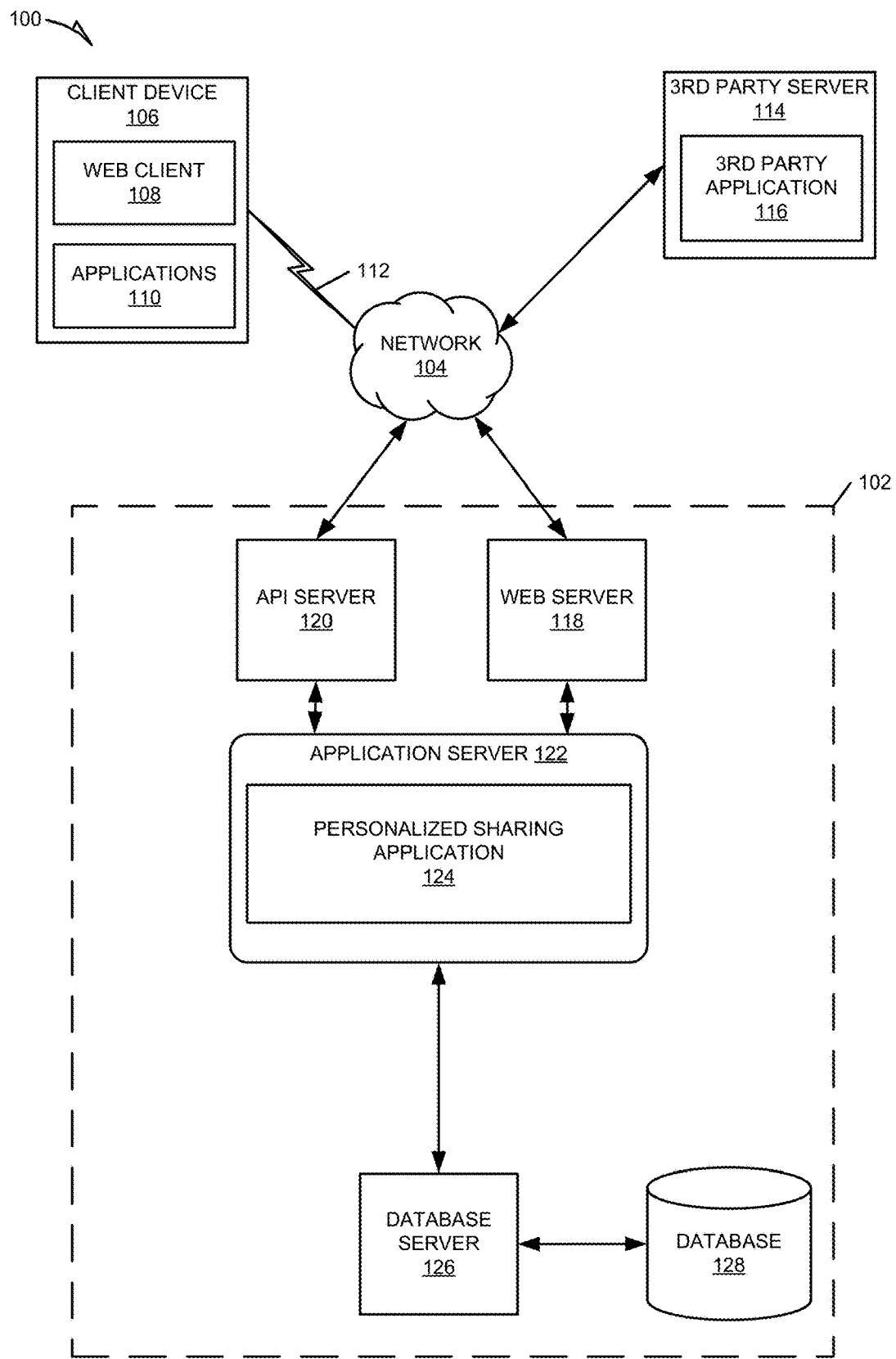
FIG. 1 is a network diagram depicting a network system having a client-server architecture configured for exchanging data over a network with a content publisher, according to an example embodiment.

FIG. 1 is a network diagram depicting a network system 100, according to one embodiment, having a client-server architecture configured for exchanging data over a network. The network system 100 may include a network-based content publisher 102 in communication with a client device 106 and a third party server 114. In some example embodiments, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client device 106). The one or more client devices may be operated by users that use the network system 100 to exchange data over a network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data among other things.

In various embodiments, the data exchanged within the network system 100 may be dependent upon user-selected functions available through one or more client or user interfaces (UIs). The UIs may be associated with a client device, such as the client device 106 using web client 108. The web client 108 may be in communication with the network-based content publisher 102 via a web server 118. The UIs may also be associated with one or more applications 110 executing on the client device 106, such as a client application designed for interacting with the network-based content publisher 102, or the third party server 114 (e.g., one or more servers or client devices) hosting a third party application 116.

The client device 106 may be any of a variety of types of devices. For example, the client device 106 may a mobile device such as an iPhone® or other mobile device running the iOS® operating system, the Android® operating system, a BlackBerry® operating system, the Microsoft® Windows® Phone operating system, Symbian® OS, or webOS®. Consistent with some embodiments, the client device 106 may alternatively be a tablet computer, such as an iPad or other tablet computer running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, or the Sony PlayStation 3®, or other video game system consoles.

The client device 106 may interface via a connection 112 with the communication network 104 (e.g., the Internet or wide area network (WAN)). Depending on the form of the client device 106, any of a variety of types of connection 112 and communication networks 104 may be used. For example, the connection 112 may be Code Division Multiple Access (CDMA) connection, a Global System for Mobile communications (GSM) connection, or other type of cellular connection. Such a connection 112 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 112 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 112 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API) server 120. In some embodiments, the third party application 116 may be associated with any organization that may conduct transactions with or provide services to the users of the client device 106. For example, the third party application 116 may be associated with a network based social network service (e.g., Facebook®, Twitter®, Google+®, Pinterest®, LinkedIn®, or the like) that may provide a platform for members to build and maintain social networks and relations among other members. To this end, the social network service may allow members to share ideas, pictures, posts, activities, events, and interests with other members of the social network. A social network service may provide a representation of each member in the form of a social network profile. The social network profile of each member may contain information about the member (hereinafter referred to as "social data") such as demographic information (e.g., gender, age), geographic information (e.g., a user's hometown, a user's current location), interests, and social network connections of the members. For purposes of the present disclosure, a social network "connection," also referred to as being "connected" on a social network, may include situations in which there is a reciprocal agreement between members of the social network to be linked on the social network, as well as situations in which there is only a singular acknowledgement of the "connection" without further action being taken by the other member. In the reciprocal agreement situation, both members of the "connection" acknowledge the establishment of the connection (e.g., friends). Similarly, in the singular acknowledgement situation, a member may elect to "follow" or "watch" another member. In contrast to reciprocal agreement, the concept of "following" another member typically is a unilateral operation because it may not call for acknowledgement or approval by the member that is being followed.

Turning specifically to the network-based content publisher 102, the API server 120 and a web server 118 are coupled to, and provide programmatic and web interfaces respectively to, one or more application server(s) 122. The application server 122 may, for example, host one or more applications, which may provide a number of content publishing and viewing functions and services to users that access the network-based content publisher 102. The application server 122 may further host a plurality of user accounts for users of the network-based content publisher 102, which may be stored in a database 128. Users of the network-based content publisher 102 without a user account may be assigned a globally unique identifier (GUID) so that such users may, nonetheless, be uniquely identified by the network-based content publisher 102.

As illustrated in FIG. 1, the application server 122 may host a personalized sharing application 124, which may provide personalized content sharing services to users of the network-based content publisher 102. For example, the personalized sharing application 124 may receive requests from a user to share a particular content item with one or more members of a social network to which the user belongs, and in turn, the personalized sharing application 124 may generate and facilitate the publishing of a personalized social network posting. As used herein, the term "content item" refers to electronic data that is consumed by viewers (e.g., users) on displays, client devices or page/display-based media (e.g., World-Wide Web (WWW) media embodied in browsers and accessible over the internet). As such, the term "content item" may refer to data associated with readable text, data associated with images, data associate with graphics or video, programmatic content, scripts, or data corresponding to various combinations of these. The social network posting may include a reference to the content item and may further include one or more content elements from the content item that are representative of at least one interest of the one or more members of the social network. A content element refers to an element, portion, or subset of content comprising a particular content item. The content element may, for example, be text, an image, an audio segment, or a video.

As illustrated in FIG. 1, the application server 122 may be coupled via the API server 120 and the web server 118 to the communication network 104, for example, via wired or wireless interfaces. The application server 122 is, in turn, shown to be coupled to a database server 126 that facilitates access to the database 128. In some examples, the application server 122 can access the database 128 directly without the need for the database server 126. In some embodiments, the database 128 may include multiple databases that may be internal or external to the network-based content publisher 102.

The database 128 may store data pertaining to various functions and aspects associated with the network system 100 and its users. For example, user accounts for users of the network-based content publisher 102 may be stored and maintained in the database 128. Each user account may comprise user data that describes aspects of a particular user. The user data may include demographic data, user preferences, and financial information. The demographic data may, for example, include information describing one or more characteristics of a user. Demographic data may, for example, include gender, age, location information, employment history, education history, contact information, familial relations, or user interests. The financial information may, for example, include private financial information of the user such as account number, credential, password, device identifier, user name, phone number, credit card information, bank information, transaction history or other financial information which may be used to facilitate online transactions by the user. Consistent with some embodiments, the transaction history may include information related to transactions for items or services (collectively referred to as "products") that may be offered for sale by merchants using marketplace services provided by the network-based content publisher 102. The transaction history information may, for example, include a description of a product purchased by the user, an identifier of the product, a category to which the product belongs, a purchase price, a quantity, or a number of bids.

The user data may also include a record of user activity, consistent with some embodiments. Accordingly, the network-based content publisher 102 may monitor, track, and record the activities and interactions of a user, using one or more devices (e.g., client device 106), with the various modules of the network system 100. Each user session may be stored in the database 128 as part of an activity log and each user session may also be maintained as part of the user data. Accordingly, in some embodiments, the user data may include past keyword searches that users have performed, web pages viewed by each user, products added to a user wish list or watch list, products added to an electronic shopping cart, and products that the users own. User preferences may be inferred from the user activity.

While the personalized sharing application 124 is shown in FIG. 1 to form part of the network-based content publisher 102, it will be appreciated that, in alternative embodiments, the personalized sharing application 124 may form part of a service that is separate and distinct from the network-based content publisher 102. Further, while the network system 100 shown in FIG. 1 employs client-server architecture, the present inventive subject matter is, of course, not limited to such an architecture, and could equally well find application in an event-driven, distributed, or peer-to-peer architecture system, for example. The various functional components of the application server 122 may also be implemented as standalone systems or software programs, which do not necessarily have networking capabilities. It shall be appreciated that although the various functional components of the network system 100 are discussed in the singular sense, multiple instances of one or more of the various functional components may be employed.

Figure 2:
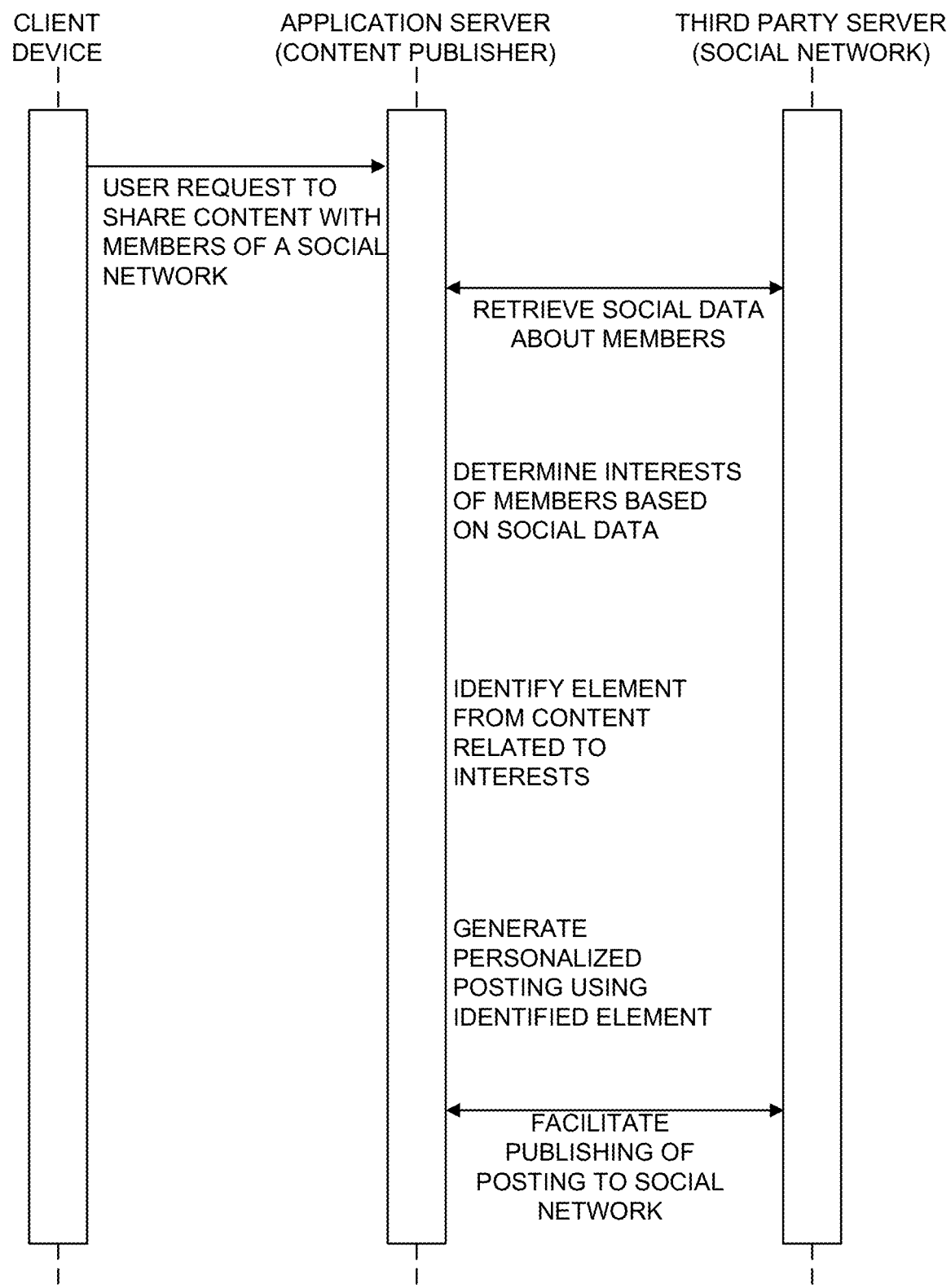
FIG. 2 is an interaction diagram depicting example exchanges between a client device, an application server, and a third party server, consistent with some embodiments.
Figure 3A:
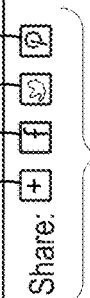
FIG. 3A is an interface diagram illustrating a portion of a web page hosted by a network-based content publisher, consistent with some embodiments.

FIG. 2 is an interaction diagram depicting example exchanges between a client device, an application server, and a third party server, consistent with some embodiments. In particular, FIG. 2 depicts example exchanges between the client device 106, the application server 122 of the network-based content publisher 102, and the third party server 114, which, in this example embodiment, corresponds to a social network service. As shown, the application server 122 may receive a user request to share content from the client device 106. The request may be generated in response to a user selection of a share widget button embedded in a web page hosted by the network-based content publisher 102. For example, FIG. 3A is an interface diagram illustrating a portion of a content item 300 hosted by the network-based content publisher 102, consistent with some embodiments. The content item 300 may correspond to a marketplace listing and may be included in a web page, consistent with some embodiments. As shown, the content item 300 may comprise multiple content elements including image 302 and text 304.

In addition, the web page includes a share widget 306 comprising buttons 308-314, each of which corresponds to a particular social network service (e.g., Google+®, Facebook®, Twitter®, and Pinterest®). The share widget 306 may be used by a user of the network-based content publisher 102 to share the content item 300 with members of a social network. The particular social network service to be utilized in sharing the content item 300 depends on the selection of the buttons 308-314. Selection of one of the buttons 308-314 results in the generation of the user request to share the content item 300. Further, the user request to share the content item 300 may include a member or group of members of a social network specified by the requesting user to which the content item 300 will be shared (also referred to herein as an "intended audience").

Returning back to FIG. 2, upon receipt of the user request to share the content item 300 with the intended audience, the application server 122 may retrieve social data about each member of the intended audience of the social network from the third party server 114 hosting the applicable social network service. The social data may include a history of social network activity of the members, demographic data, and member interests, among other information. The application server 122 may then determine an interest of the members of the intended audience. This determination may be based on interests specified by the members in each member's respective social network profile, or based on information included in the history of social network activity of each member. In embodiments in which multiple members of the social network are selected as the intended audience for the sharing of the content, the application server 122 may identify an interest that is common to all members of the intended audience. Upon determining the interest of the intended audience, the application server 122 may identify a content element from the content item 300 that is representative of, or related to, the interest of the intended audience. For example, the application server 122 may determine that the intended audience has an interest in "technology," and the application server 122 may recognize from the text 304, a content element of content item 300, a reference to "smartphones." Given that "smartphones" are related to "technology," the application server 122 may identify the textual element, "This bag also features a built-in specialized pocket for smartphones for easy storage and access," as a content element being representative of the interest (e.g., "technology) of the intended audience. The application server 122 may then generate a personalized social network posting using the identified content element.

Figure 3B:
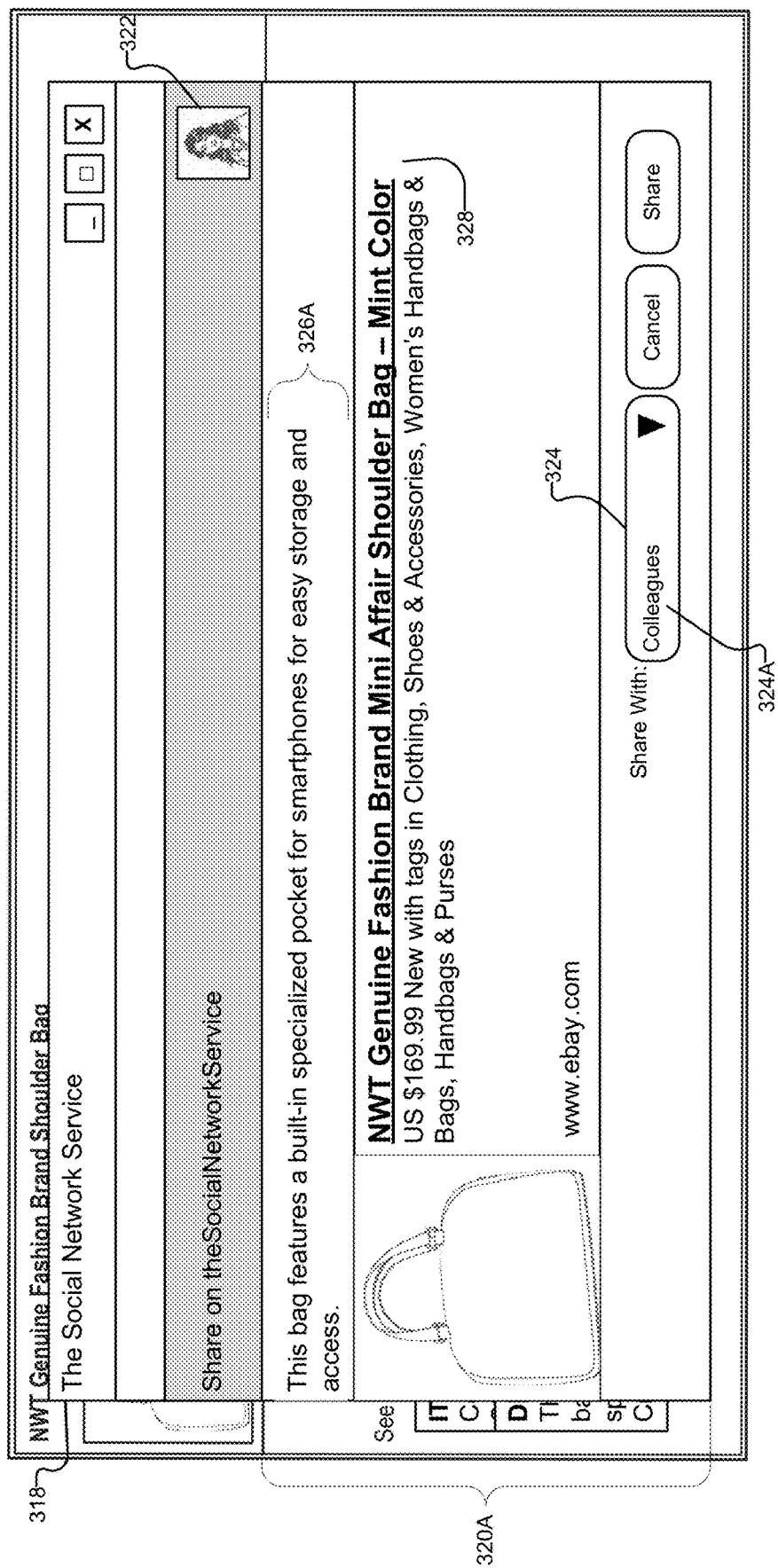
FIG. 3B is an interface diagram illustrating a window for facilitating the publishing of a personalized social network posting, consistent with some embodiments.

FIG. 3B is an interface diagram illustrating a window 318 for facilitating the publishing of a personalized social network posting 320A, consistent with some embodiments. The window 320 may be presented in response to a selection or manipulation of one of the buttons 308-314 comprising the share widget 306, and may be presented overlaid upon the content item 300, consistent with some embodiments. As shown, the window 320 may include an identification of the requesting user (e.g., image 322) and may include an input field 324 for specifying an intended audience 324A, which, in this example, corresponds to members of the social network that are "colleagues" of the requesting user. It shall be appreciated that although FIG. 3B illustrates the input field 324 as providing the ability to select from one or more predefined groups of members of the social network, in other embodiments, the selection of the audience may be that of one or more individual members that may not necessarily comprise an existing predefined group.

From the retrieved social data of the intended audience 324A, the application server 122 may determine that the intended audience 324A has an interest in "technology," and in turn, the application server 122 may select a content element 326A (e.g., the textual element, "This bag features a built-in specialized pocket for smartphones for easy storage and access.") from the content item 300, as discussed above, to be included in the personalized social network posting 320A. Further, a reference 328 to the content item 300 (e.g., a uniform resource locator (URL) referencing a web page, in which the content item 300 is located) may be included in the personalized social network posting 320A. Consistent with some embodiments, the requesting user may be able to edit the personalized social network posting 320A or provide additional comments before the personalized social network posting 320A is ultimately published by the social network service.

Figure 3C:
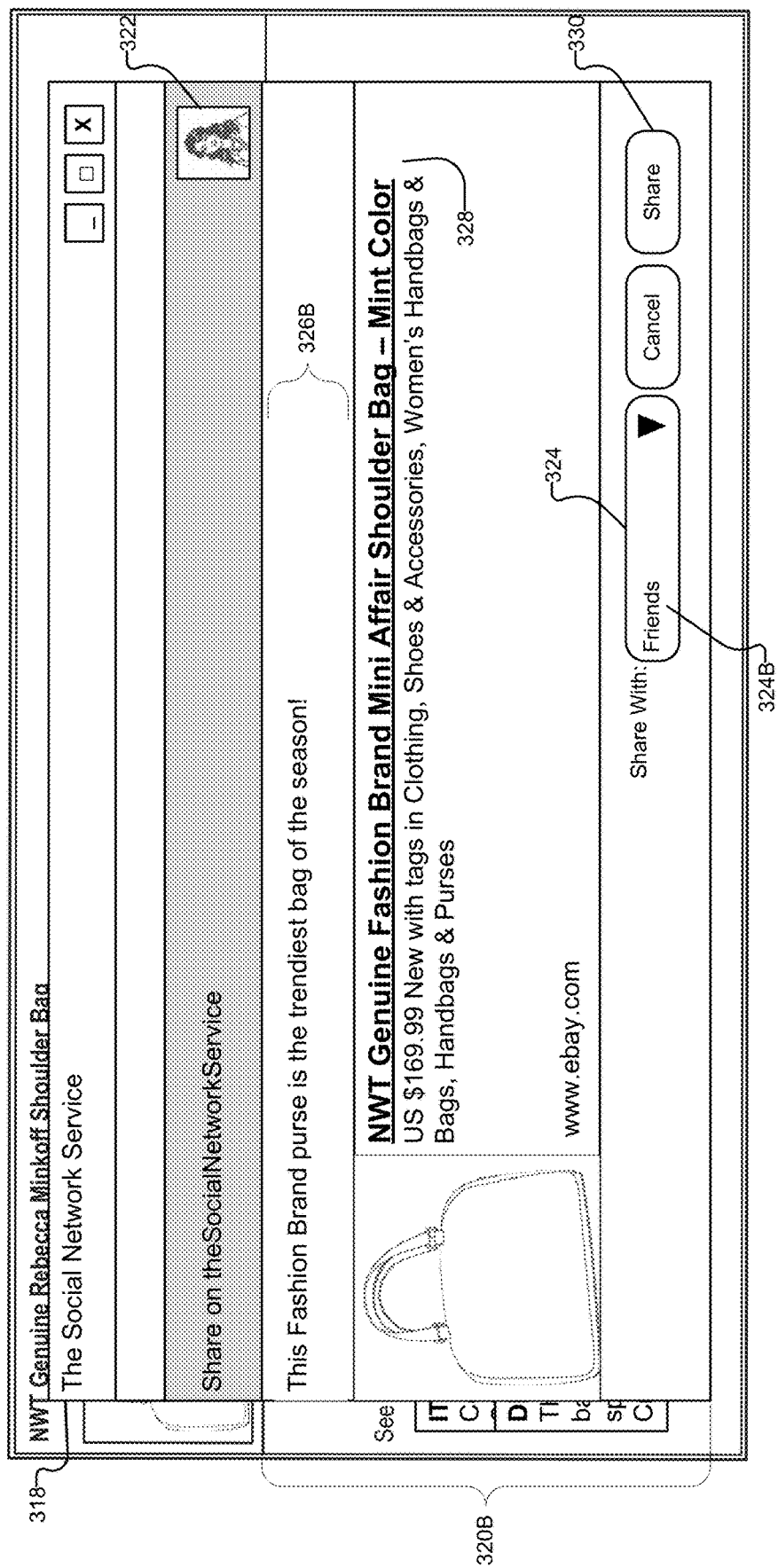
FIG. 3C is an interface diagram illustrating a window for facilitating the publishing of another personalized social network posting, consistent with some embodiments.

FIG. 3C is an interface diagram illustrating the window 320 for facilitating the publishing of an alternative personalized social network posting 320B, consistent with some embodiments. As shown, the intended audience 324B specified in the input field 324 is different than that of the personalized social network posting 320A. In particular, the intended audience 324B specified for the personalized social network posting 320B corresponds to the "friends" of the requesting user. From the social data about the intended audience 324B, the application server 122 may determine that the intended audience 324B has an interest in "fashion." As a result, the application server 122 may select the content element 326B (e.g., the textual element, "This Fashion Brand purse is the trendiest bag of the season!") from the text 304 of content item 300 for inclusion in the personalized social network posting 320B because the element 326B is related to the identified interest of "fashion" for the intended audience 324B. The requesting user may cause the application server 122 to facilitate the publishing of the personalized social network posting 320B through selection of button 330 (e.g., a "share" button).

Returning back to FIG. 2, the application server 122 may, upon receiving approval from the requesting user (e.g., through selection of the button 330), facilitate the publishing of the personalized social network posting 320A or 320B with the social network service hosted by third party server 114. Upon being published, the personalized social network posting 320A or 320B may be viewed by the intended audience 324A or 324B.

Figure 3D:
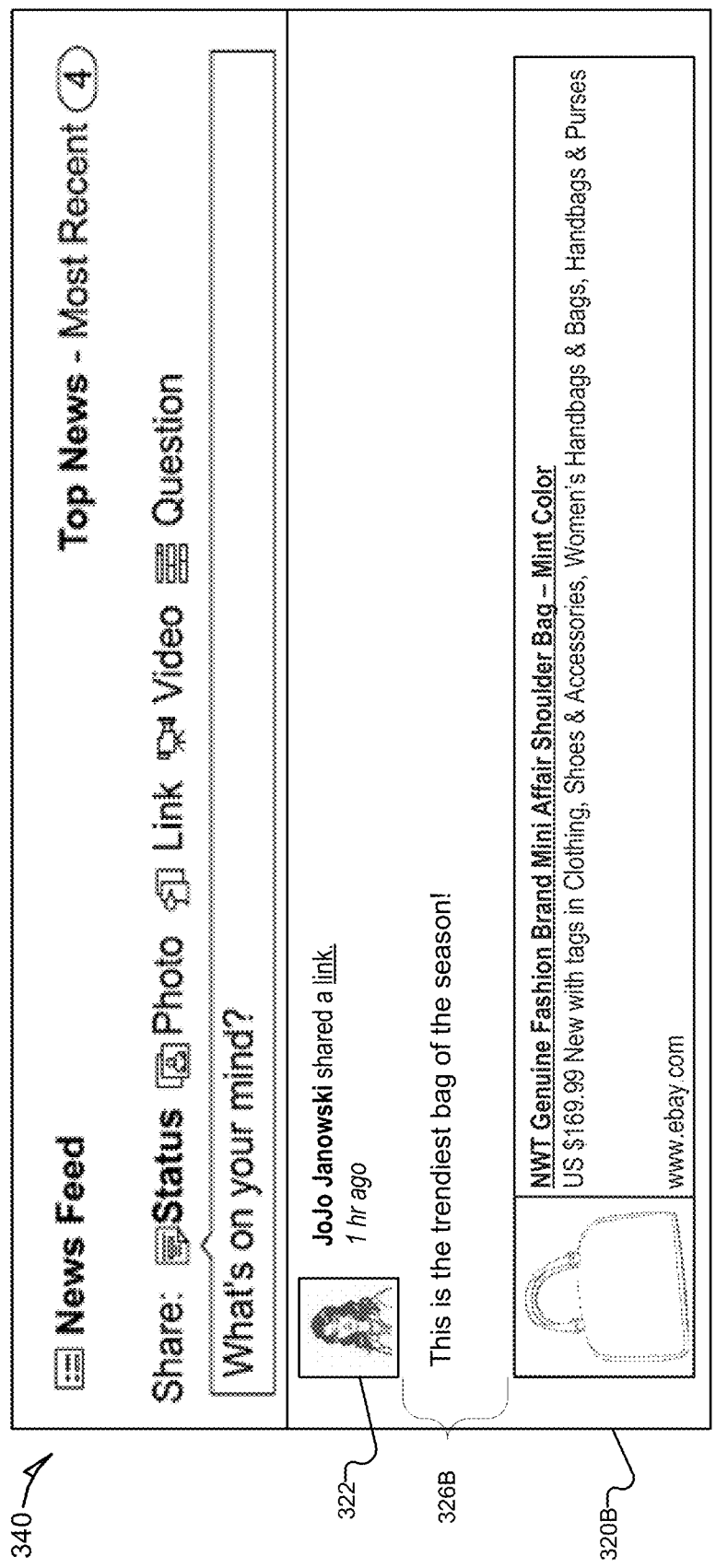
FIG. 3D is an interface diagram illustrating a social network activity feed including a published personalized social network posting, consistent with some embodiments.

For example, FIG. 3D illustrates a social network activity feed 340 of an intended audience member that includes the published personalized social network posting 320B, consistent with some embodiments. As shown, the requesting user is identified by name and user image 322. Further, the published personalized social network posting 320B includes the reference 328 to content item 300 (e.g., a URL or link) and the content element 326B from the text 304 of the content item 300. The inclusion of the content element 326B causes the personalized social network posting 320B to be catered to the interests of the intended audience 324B (e.g., "fashion"), and therefore, increases the likelihood that the intended audience 324B may view and engage with the content item 300.

Figure 4:
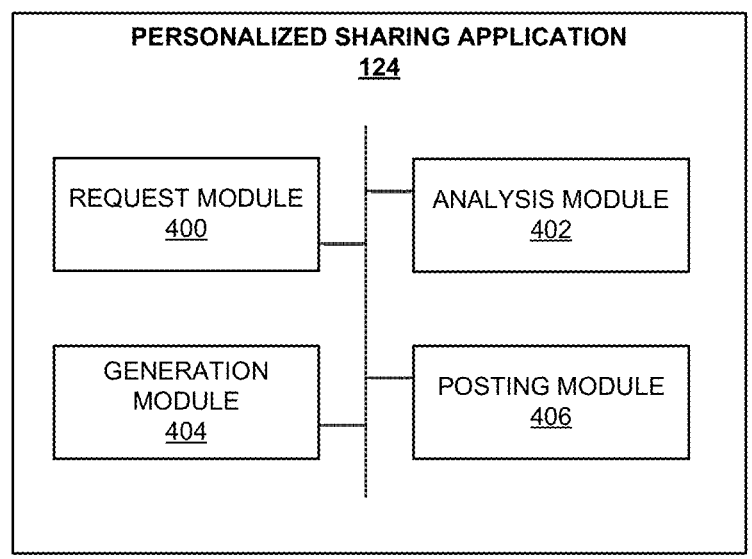
FIG. 4 is a block diagram illustrating various functional modules of a personalized sharing application, which is provided as part of the network system, consistent with some embodiments.

FIG. 4 is a block diagram illustrating various functional modules of the personalized sharing application 124, which is provided as part of the network system 100, consistent with some embodiments. The personalized sharing application 124 is shown as including a request module 400, an analysis module 402, generation module 404, and a posting module 406, all configured to communicate with each other (e.g., via a bus, shared memory, a switch, or application programming interfaces (APIs)). The various modules of the personalized sharing application 124 may, furthermore, access one or more databases 128 via the database servers 126, and each of the various modules of the personalized sharing application 124 may each be in communication with one or more of the third party applications 116 (e.g., a social network service). Further, while the modules of FIG. 4 are discussed in the singular sense, it will be appreciated that in other embodiments multiple modules may be employed.

The request module 400 may be configured to receive and process user requests to share content with an intended audience (e.g., intended audience 324B). The requests may include an identifier of the content and an identification of one or more members of a social network (e.g., the intended audience). The identifier of the one or more members may include an identifier (e.g., a name, a numerical identifier, or an email address) of a social network profile of each member or an identifier of a user account of each member provided by the network-based content publisher 102. Consistent with some embodiments, the user requests may result from selection of a sharing widget button included in the presentation of a content item published by the network-based content publisher 102.

The analysis module 402 may be configured to retrieve and analyze social data about each member of the intended audience. The analysis module 402 may obtain social data about the members of the intended audience via publically accessible APIs provided by each social network service. The social data may include information about each of the members including, for example, demographic information, interests specified by the user, and a history of social network activity.

For purposes of the present disclosure, "social network activity" collectively refers to entries (e.g., text and image postings, links, messages, notes, invitations) created, shared, and interacted with by members of a social network with other members of the social network. Such social network activity may include entries that are intended for the public at large as well as entries intended for a particular social network connection or group of social network connections. Depending on the social network, the social network activity may include entries such as an activity feed post, a wall post, a status update, a tweet, a pinup, a like, a content share (e.g., content shared from a source such as the network-based content publisher 102), or a check-in. For purposes of the present disclosure, a "check-in" refers to a service provided by a social network that allows users to "check-in" to a physical space and share their location with other users of the social network. In some embodiments, a user may check-in to a specific location by sending a text message to the relevant social network service. Consistent with some embodiments, users may check-in to a specific location by using a mobile application provided by the social network on a client device (e.g., client device 106). The social network mobile application may use the GPS functionality of the client device to find the current location of the user and allow the user to share this information with other users of the social network.

Consistent with some embodiments, the analysis module 402 may analyze the social data of each member of the intended audience to identify one or more interests of the members. In some embodiments, the identified interests may be those specifically listed by each member when establishing accounts with the applicable social network service. In some embodiments, the interests identified by the analysis module 402 may be based on subjects or concepts for which members of the intended audience have demonstrated an affinity for (e.g., a "like," an up vote, thumbs up, a high rating, a "plus one," or the like). In some other embodiments, the identifying of the interests performed by the analysis module 402 may include inferring the interests from the social network activity history of each member. For example, the analysis module 402 may determine that a particular member of a social network has an interest in "automobiles" based on the social network activity history of the member including multiple "likes" of various automobile manufactures. In another example, the analysis module 402 may determine that a particular member of a social network has an interest in "food" based on the social network activity history of the member including multiple check-ins to restaurants. In yet another example, the analysis module 402 may determine that a particular member of a social network has an interest in "travel" based on the social network activity history of the member including multiple content sharing postings of travel guides.

Consistent with some embodiments, the members of the intended audience may be known users of the network-based content publisher 102 with corresponding user accounts. In such embodiments, the analysis module 402 may identify interests of the intended audience based on, for example, content items viewed by the user, a transactional history of the user (e.g., items purchased by the user), or items added to an electronic shopping cart of the user. For example, the analysis module 402 may determine that a user has an interest in "Gardening" based on the transactional history of the user including multiple purchases of gardening tools.

Consistent with some embodiments, the analysis module 402 may be further configured to identify and select content elements from content items (e.g., content items for which a user request to share has been received) that are related to or representative of the identified interests of the members of a social network. The content elements included in content items may, for example, include text, images, audio, or video. In instances in which the content item being analyzed includes text, the analysis module 402 may, using known text analysis techniques, identify keywords known to be associated with the interests of the members. Records of known keywords associated with each identifiable interest may be stored in the database 128. In instances in which the content item being analyzed includes images or video, the analysis module 402 may, using known image recognition techniques, identify objects or concepts from the images or video that is associated with the interests of the members. Upon identifying a content element that is related or representative of the interests of the members of the social network, the analysis module 402 may select the content item and provide the selected content item to the generation module 404 for inclusion in a personalized content sharing posting.

Consistent with some embodiments, the analysis module 402 may be configured to determine a preferred formatting of the intended audience. The determination of the preferred formatting may be based on the members' engagement with previous content sharing postings as indicated by the respective social network activity history of each member. From the members' positive engagement (e.g., a click, a "like," a retweet, or the like) with content sharing postings formatted in a particular manner, the analysis module 402 may determine the preferred format of the members. For example, if the social network activity history of a particular user shows that the user routinely "likes" content share postings formatted in a particular manner, the analysis module 402 may determine that the manner in which these content share postings are formatted is the preferred formatting of the user. In some embodiments, the preferred format may include a preferred content type or file type. For example, based on the social network activity history of the intended audience, the analysis module 402 may determine that the intended audience prefers images over text. The preferred content type may be used by the analysis module 402 to select a content element to be included in the personalized content sharing posting, consistent with some embodiments.

The generation module 404 may be configured to generate a personalized content sharing posting to share a content item included in a user request to share such. The personalized content sharing posting generated by the generation module 404 may reference the content item to be shared (e.g., a link or URL) and my further include the content element identified by the analysis module 402. In some embodiments, the generation module 404 may further format the personalized content posting according to the preferred format determined by the analysis module 402.

The posting module 406 may be configured to facilitate the publishing of the personalized social network posting. Consistent with some embodiments, the posting module 406 may employ a publically available API provided by the applicable social network service to pass information, including the personalized social network posting, to the social network service, which may ultimately publish the posting on behalf of the requesting user.

Figure 5:
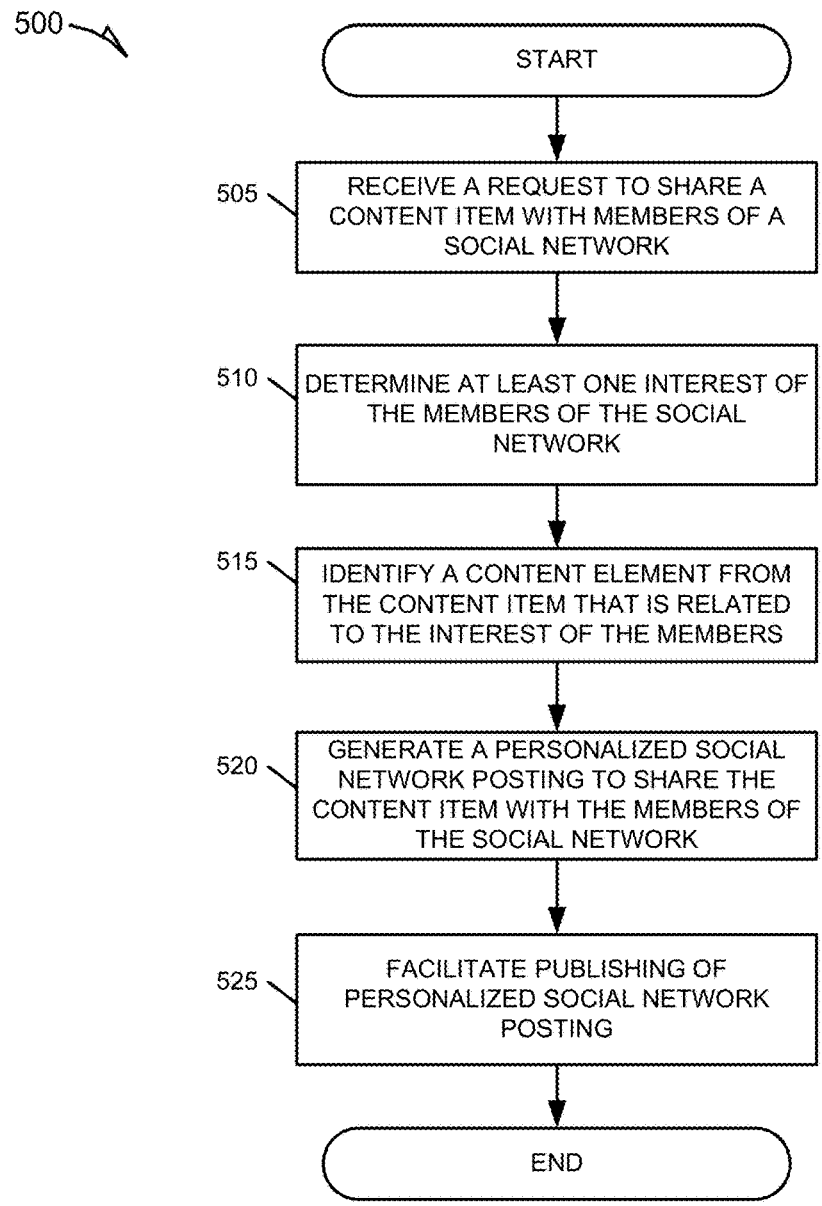
FIG. 5 is a flowchart illustrating a method for providing a personalized content sharing service, consistent with some embodiments.

FIG. 5 is a flowchart illustrating a method 500 for providing a personalized content sharing service, consistent with some embodiments. The method 500 may be embodied in computer-readable instructions for execution by one or more processors such that the steps of the method 500 may be performed in part or in whole by the application server 122, and in particular, the modules comprising the personalized sharing application 124.

At operation 505, the request module 400 may receive a request to share a content item with one or more members of a social network. The request may be received as a result of a user selection of a button comprising a share widget (e.g., share widget 306) embedded in a web page in which the content item is included.

At operation 510, the analysis module 402 may determine at least one interest of the one or more members of the social network. The at least one interest may be based on social data about the one or more members, consistent with some embodiments. The social data may, for example, include demographic information (e.g., gender, age), geographic information (e.g., a user's hometown, a user's current location), interests, social network connections of the members, and a history of social network activity. In some embodiments, the determining of the at least one interest of the one or more members may be based on interests of the members included in the social data or one concepts for which the members have conveyed an affinity for (e.g. a "like," an up vote, thumbs up, a high rating, a "plus one," or the like). In some other embodiments, the determining the at least one interest of the one or more members may be based on a history of social network activity of each member included in the social data. In still other embodiments, the determining of the at least one interested may be based on a transactional history of the one or more members that may be maintained by the network-based content publisher 102.

At operation 515, the analysis module 402 may identify a content element from the content item that is related to the at least one interest of the one or more members of the social network. The identified content element may be text, an image, a video, or an audio segment. The operation of identifying the content element from the content item performed by the analysis module 402 may include performing text analysis of content elements that include text to identify keywords related to the at least one or more interests, consistent with some embodiments. The identified keywords or portions of text including the identified keywords may be selected by the analysis module 402. In some embodiments, the operation of identifying the content element from the content item performed by the analysis module 402 may comprise performing image recognition according to known techniques to identify objects in the images that are related to the at least one interest of the one or more members of the social network.

At operation 520, the generation module 404 may, in an automated operation without further user interaction, generate a personalized social network posting that is tailored to the interest of the intended audience (e.g., the one or more members of the social network identified in the request to share the content item). The personalized social network posting may include a reference to the content item that enables the intended audience to view the content item on a web page or other resource provided by the network-based content publisher 102. The personalized social networking posting may further include the content element identified at operation 515, so as to customize the posting to the interests of the intended audience. At operation 525, the posting module 406 may facilitate the publishing of the personalized social network posting with the applicable social network service (e.g., the social network service corresponding to the share widget button selected by the requesting user).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 6:
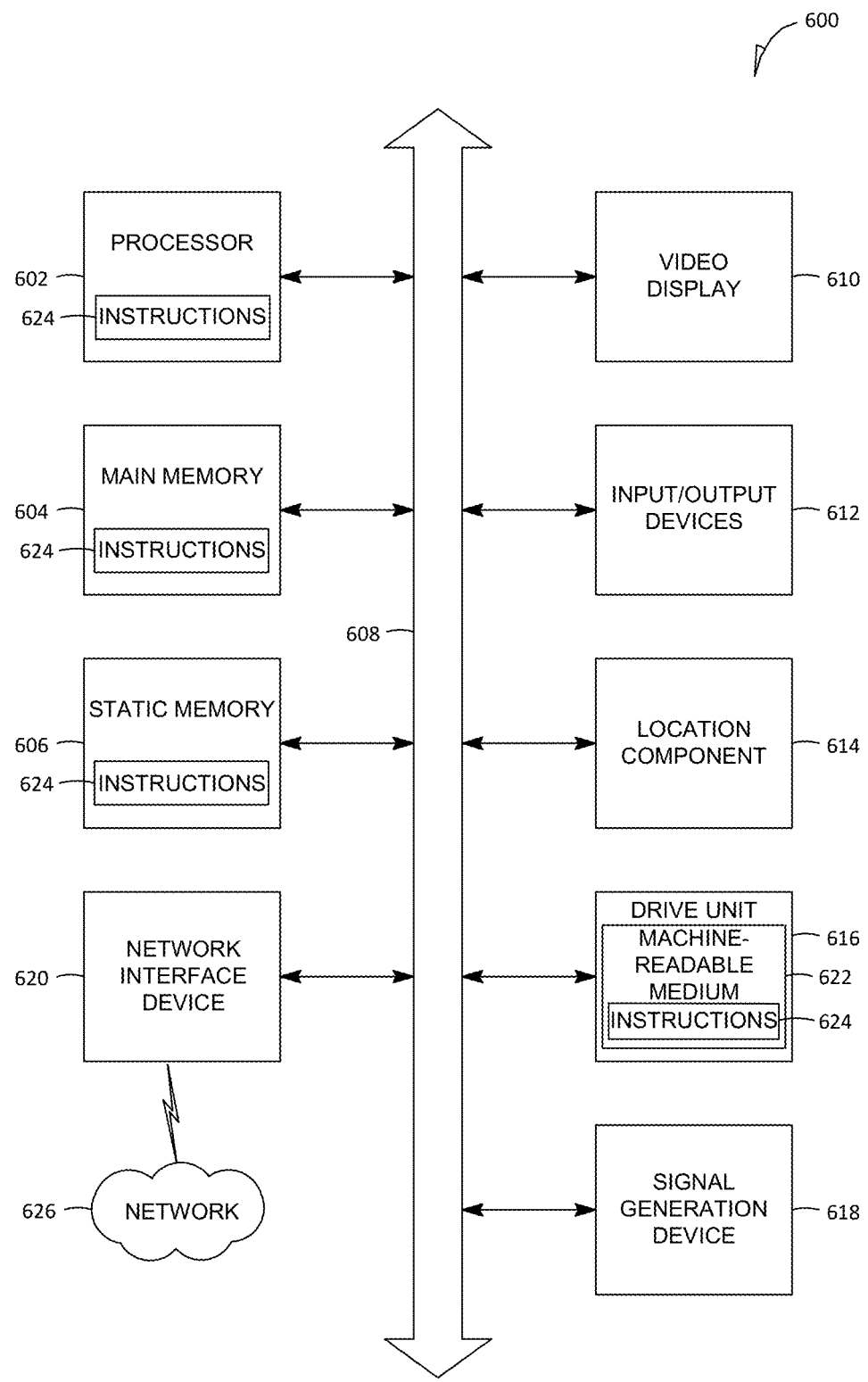
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may correspond to client device 106, third party server 114, or application server 122, consistent with some embodiments. The computer system 600 may include instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a STB, a PDA, a cellular telephone, a smart phone (e.g., iPhone®), a tablet computer, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in main memory 604 or static memory 606. In some embodiments, a mobile location enabled application may work in conjunction with the location component 614 and the network interface device 620 to transmit the location of the computer system 600 to an application server or third party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, static memory 606, and/or within the processor 602 during execution thereof by the computer system 600, with the main memory 604, the static memory 606, and the processor 602 also constituting machine-readable media.

Consistent with some embodiments, the instructions 624 may relate to the operations of an operating system. Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 624 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

What is claimed is:

1. A system comprising:
 one or more hardware processors of a machine; and a machine-readable storage medium storing instructions that, when executed by the one or more hardware processors, cause the machine to perform operations comprising:

receiving, from a client device via a network interface of the machine, a reference to a content item comprising an image depicting a product and a selection of an icon from a plurality of icons, the icon corresponding to a social network service different from a content publisher hosting the content item;

receiving a selection of an intended audience corresponding to the social network service;

determining a common interest of a plurality of members of the intended audience based on social data pertaining to the plurality of members of the intended audience of the social network service different from the content publisher hosting the content item;

using an image recognition module to identify a content element of the content item based on image data associated with the image depicting the product, the content element being representative of the common interest of the plurality of members of the intended audience;

generating a personalized social network posting associated with the social network service based on the content element representative of the common interest, the personalized social network posting including a link of the product available on a network-based marketplace of the content publisher and a price value associated with the product;

causing display of the personalized social network posting in a user interface of the client device, the user interface including an input field for receiving a user input to be displayed along with the personalized social network posting and a share button, a selection of the share button causing a generation of a social network activity feed including both the personalized social network posting and the user input to be displayed on a social network platform of the social network service.

2. The system of claim 1, wherein the personalized social network posting includes a tag corresponding to a product category that is associated with the product.

3. The system of claim 1, wherein the operations further comprise:
retrieving social data of a first member of the plurality of members of the intended audience based on a corresponding social network profile of the first member, the social data including a history of social network activity of the first member.

4. The system of claim 3, wherein determining the common interest of the plurality of members of the intended audience comprises identifying a subject for which the first member has previously conveyed an affinity using the social network service.

5. The system of claim 1, wherein the content item includes a text element, and wherein using the image recognition module to identify the content element comprises using the image recognition module to identify a keyword from the text element included in the content item.

6. The system of claim 1, wherein the operations further comprise:
identifying a preferred format selected by a user associated with the client device; and
formatting the personalized social network posting according to the preferred format selected by the user.

7. The system of claim 6, wherein the preferred format includes a preferred file type.

8. The system of claim 6, wherein the preferred format includes a preferred content type.

9. A method comprising:
receiving, from a client device via a network interface of a machine, a reference to a content item comprising an image depicting describing a product and a selection of an icon from a plurality of icons, the icon corresponding to a social network service different from a content publisher hosting the content item;

receiving a selection of an intended audience corresponding to the social network service;

determining a common interest of a plurality of members of the intended audience based on social data pertaining to the plurality of members of the intended audience of the social network service different from the content publisher hosting the content item;

using an image recognition module to identify at least a content element portion of the content item based on image data associated with the image depicting the product, the content element being representative of the common interest of the plurality of members of the intended audience;

generating a personalized social network posting associated with the social network service based on the content element representative of the common interest, the personalized social network posting including a link of the product available on a network-based marketplace of the content publisher and a price value associated with the product;

causing display of the personalized social network posting in a user interface of the client device, the user interface including an input field for receiving a user input to be displayed along with the personalized social network posting and a share button, a selection of the share button causing a generation of a social network activity feed including both the personalized social network posting and the user input to be displayed on a social network platform of the social network service.

10. The method of claim 9, further comprising:
retrieving social data of a first member of the plurality of members of the intended audience based on from a corresponding social network profile of the first member.

11. The method of claim 10, wherein the social data includes a history of social network activity of the first member.

12. The method of claim 9, wherein the personalized social network posting includes a tag corresponding to a product category that is associated with the product.

13. The method of claim 9, further comprising:
retrieving social data of a first member of the plurality of members of the intended audience based on a corresponding social network profile of the first member, the social data including a history of social network activity of the first member.

14. The method of claim 13, wherein determining the common interest of the plurality of members of the intended audience comprises identifying a subject for which the first member has previously conveyed an affinity using the social network service.

15. The method of claim 9, wherein the content item includes a text element, and wherein using the image recognition module to identify the content element comprises using the image recognition module to identify a keyword from the text element included in the content item.

16. The method of claim 15, wherein the keyword is obtained from a repository of keywords, the keyword being representative of the common interest, the repository of keywords including a record for a plurality of identifiable interests.

17. The method of claim 9, further comprising:
identifying a preferred format selected by a user associated with the client device; and
formatting the personalized social network posting according to the preferred format selected by the user.

18. The method of claim 17, wherein the preferred format includes a preferred file type.

19. The method of claim 17, wherein the preferred format includes a preferred content type.

20. A non-transitory machine-readable storage medium storing instructions that, when executed by one or more hardware processors of a machine, cause the one or more hardware processors to perform operations comprising:
receiving, from a client device via a network interface of the machine, a reference to a content item comprising an image depicting a product and a selection of an icon from a plurality of icons, the icon corresponding to a social network service different from a content publisher hosting the content item;
receiving a selection of an intended audience corresponding to the social network service;
determining a common interest of a plurality of members of the intended audience based on social data pertaining to the plurality of members of the intended audience of the social network service different from the content publisher hosting the content item;
using an image recognition module to identify a content element of the content item based on image data associated with the image depicting the product, the content element being representative of the common interest of the plurality of members of the intended audience;
generating a personalized social network posting associated with the social network service based on the content element representative of the common interest, the personalized social network posting including a link of the product available on a network-based marketplace of the content publisher and a price value associated with the product;
causing display of the personalized social network posting in a user interface of the client device, the user interface including an input field for receiving a user input to be displayed along with the personalized social network posting and a share button, a selection of the share button causing a generation of a social network activity feed including both the personalized social network posting and the user input to be displayed on a social network platform of the social network service.

* * * * *